United States Patent [19]

Watanabe

[11] 4,073,360
[45] Feb. 14, 1978

[54] ARRANGEMENT OF FUEL SYSTEM IN MOTOR VEHICLE

[75] Inventor: Kuniyuki Watanabe, Yokohama, Japan

[73] Assignee: Nissan Motor Company, Limited, Japan

[21] Appl. No.: 733,703

[22] Filed: Oct. 19, 1976

[30] Foreign Application Priority Data

Oct. 20, 1975 Japan .......................... 50-142655[U]

[51] Int. Cl.² ...................... B60R 27/00; B65D 25/00
[52] U.S. Cl. ................................ 180/104; 220/85 R; 220/86 R
[58] Field of Search ............................ 180/103 R, 104; 220/86 R, 85 R, 85 VR; 137/312, 43

[56] References Cited

U.S. PATENT DOCUMENTS

| 3,672,537 | 6/1972 | Kitzner | 220/85 VR |
| 3,685,504 | 8/1972 | Torazza | 220/85 VR |
| 3,817,421 | 6/1974 | Andres | 220/86 R |
| 3,915,184 | 10/1975 | Galles | 137/43 |
| 3,972,340 | 8/1976 | Miller et al. | 180/104 |

Primary Examiner—Joseph F. Peters, Jr.
Assistant Examiner—R. Schrecengost

[57] ABSTRACT

A carburetor is disposed on the vehicle body in a position which is laterally deviated from the vehicle centerline. A fuel tank extends laterally of the vehicle body to cross the vehicle longitudinal centerline and terminates near its side walls. A fuel return line has one end portion which is arranged to communicate with the interior of the fuel tank in close proximity to a side wall of the fuel tank which is opposite to the carburetor with respect to the vehicle longitudinal centerline.

4 Claims, 8 Drawing Figures

ARRANGEMENT OF FUEL SYSTEM IN MOTOR VEHICLE

The present invention relates to a motor vehicle provided with a fuel system for a hydrocarbon liquid fuel and, more particularly, to an improved arrangement of the fuel system of the character in which the liquid fuel stored in its fuel tank is prevented from leaking out upon accidental vehicle overturns.

A conventional motor vehicle powered by a hydrocarbon liquid fuel such as gasoline includes a fuel system for supplying its combustion engine with the liquid fuel, which system generally includes a carburetor, a fuel tank and connecting lines such as a fuel feed line and a fuel return line through which the liquid fuel stored in the fuel tank is conveyed to the carburetor and the excess returned therefrom to the fuel tank.

When the motor vehicle with an above-mentioned fuel system meets with an accident and overturns, even if its fuel system is not so seriously damaged that breakages of its components occur, the liquid fuel stored in the fuel tank can still flow therefrom to the carburetor through the fuel return line and leak out from the carburetor to drench the motor vehicle and the ground. If such fuel catches fire, an accident in which the vehicle overturns can become more calamitous.

The foregoing fuel leakage problem inherent in the conventional motor vehicle can be solved by incorporating valve means such as a check valve or an one-way valve into the fuel return line.

However according to the present invention such gasoline leakage can be satisfactorily overcome without incorporating into the fuel return line such additional parts as the above-mentioned valve means.

It is accordingly an object of the present invention to provide an improved arrangement of a fuel system which is free from the foregoing fuel leakage problem without incorporating additional parts such as valve means.

Other objects, features and advantages of the present invention will become apparent from the following description taken in connection with the accompanying drawings, in which.

Referring now to the drawings, wherein like reference characters designate like or corresponding parts throughout.

Figure 1A:
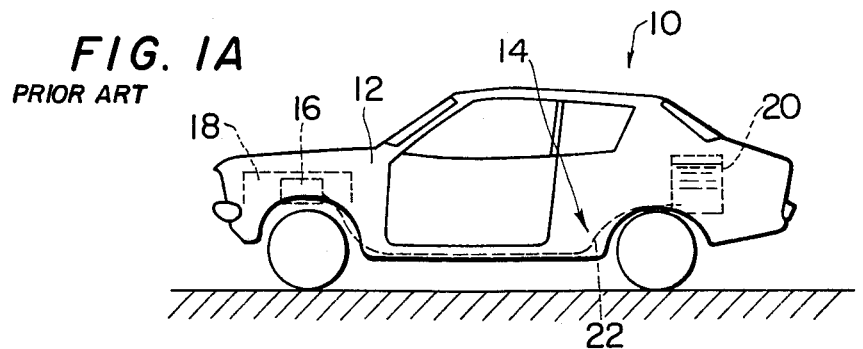
FIG. 1A is one side view of a motor vehicle shown in a normal upright position and shows a normal location of a fuel system arranged therein according to the prior art.

Analysis of the foregoing fuel leakage problem inherent in the conventional motor vehicle provided with a fuel system for a hydrocarbon liquid fuel such as gasoline is made according to the present invention with reference to the drawings, particularly to FIGS. 1A to 1D inclusive wherein the reference numeral 10 designates a conventional motor vehicle powered by a hydrocarbon liquid fuel which comprises an elongated vehicle body 12 having a substantially parallel first and second lateral walls 12a and 12b and a fuel system 14 for a hydrocarbon liquid fuel such as gasoline. The fuel system 14 comprises a carburetor 16 for supplying a cylinder (not shown) of an internal combustion engine 18 with a liquid fuel, a fuel tank 20 extending laterally of the vehicle body 12 to cross the vehicle longitudinal center line A and terminating at its first and second side walls 20a and 20b which are respectively directed toward the first and second lateral walls 12a and 12b of the vehicle body 12, and a fuel return line establishing communication between the carburetor 16 and the fuel tank 20.

In this instance, the fuel tank 20 is disposed at the rear of the vehicle body 12 and the carburetor 16 is at the front. As seen from FIG. 1B, the carburetor 16 is deviated laterally of the vehicle body 12 from the vehicle longitudinal centerline A in the direction toward the first lateral wall 12a, viz., if the vehicle body 12 is in a normal position as shown in FIG. 1A, the carburetor 16 is horizontally deviated from the vertical plane which extends including a vehicle longitudinal centerline A in a direction toward the first lateral wall 12a.

Figure 1B:
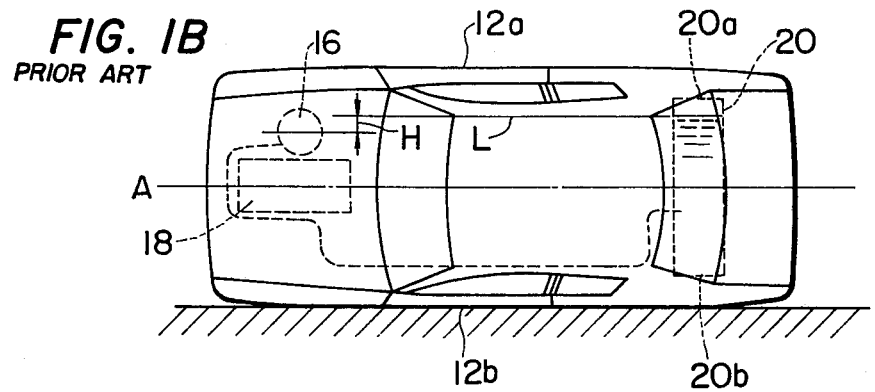
FIG. 1B is a top view of the motor vehicle and the fuel system of FIG. 1A shown in a partially overturned position with the vehicle body lying on its right side wall when viewed from the front end of the motor vehicle.
Figure 1C:
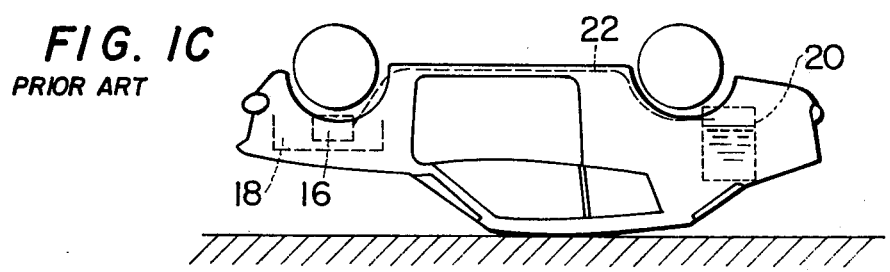
FIG. 1C is the other side view of the motor vehicle of FIG. 1A shown in a fully overturned position with the vehicle body lying on its roof.
Figure 1D:
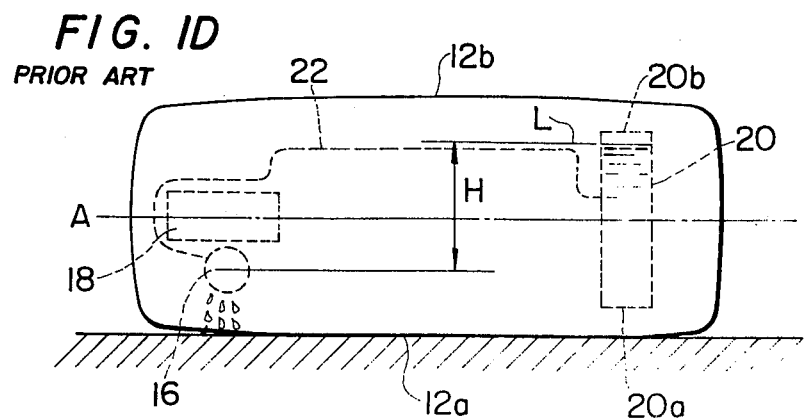
FIG. 1D is a bottom view of the motor vehicle and the fuel system of FIG. 1A shown in a partially overturned position with the vehicle body lying on its left side wall when viewed from the front end of the motor vehicle.

A bireff classification of the possible positions which an overturned vehicle can take is made as shown in FIGS. 1B to 1D. In connection with each position of the vehicle body 12, the possibility of fuel leakage of the fuel system 14 is classified as follows.

FIG. 1B shows a position of the vehicle body 12 partially overturned sideways by an angle of 90° from its normal position shown in FIG. 1A and lying on the second lateral wall 12b which is a right side wall when viewed from the front end of the motor vehicle 10. In this vehicle body overturn position, the carburetor 16 is in a position which is vertically higher than the vehicle longitudinal centerline A and may be lower than the fuel level L in the fuel tank 20 if the liquid fuel is sufficiently stored in the fuel tank 20. However the vertical distance between the carburetor 16 and the fuel level L is so small that quite only a small amount of the liquid fuel can leak out from the carburetor 16 since the liquid fuel flow made due to its own weight (gravity) from the fuel tank 20 to the carburetor 16 through the fuel return line 22 occurs only when the fuel level L is higher than the carburetor 16. Therefore this vehicle overturn position does not induce the foregoing fuel leakage problem.

FIG. 1C shows a position of the vehicle body 12 fully overturned by an angle of 180° from its normal position shown in FIG. 1A. In this vehicle overturn position, the carburetor 16 is necessarily given a overturned or upset location from its normal location. As is well known in the art, the carburetor 16 generally includes a float chamber (not shown) communicating with the fuel tank 20 through the fuel return line 22 and a float (not shown) operable to regulate the communication between the float chamber and the fuel tank 20. In this upset location of the carburetor 16, the float operates to permanently cut off the communication between the float chamber and the fuel tank 20 by its own weight and accordingly the liquid fuel flow from the fuel tank 20 to the carburetor 16 through the fuel return line 16 does not occur. Furthermore since the fuel return line 22 is connected to the fuel tank 20 at a vertical position in close proximity to its bottom wall, the fuel return line 22 may open to the empty space in the fuel tank 20 upon this vehicle overturn position. Therefore this vehicle overturn position does not induce the foregoing fuel leakage problem.

FIG. 1D shows a position of the vehicle body 12 partially overturned sideways by an angle of 90° from its normal position shown in FIG. 1A and lying on the first lateral wall 12a which is a left side wall when viewed from the front end of the motor vehicle 10. In this vehicle overturn position, the carburetor 16 is in a position which is vertically lower than the vehicle longitudinal centerline A. Therefore the vertical distance H between the fuel level L in the fuel tank 20 and the carburetor 16 is so large that a considerable amount of the liquid fuel stored in the fuel tank 20 can leak out from the carburetor 16 through the fuel return line 22 until the fuel level L reaches the lower level at which the fuel return line 22 is connected to the interior of the fuel tank 20. Therefore this vehicle overturn position will induce the foregoing fuel leakage problem.

Although an explanation with respect to connecting piping between the carburetor 16 and the fuel tank 20 has been made and shown only to the fuel return line 22, there is necessarily provided with the fuel system 14 a fuel feed line (not shown) for delivering the liquid fuel stored in the fuel tank 20 to the carburetor 16, which feed line is arranged substantially parallel to the fuel return line 22 and provided with a fuel pump and a fuel filter (neither shown) as is customary. However in case of accidental vehicle overturns, the fuel pump usually stops operating and serves as a valve means which shuts off or blocks the communication between the carburetor 16 and the fuel tank 20 through the fuel feed line. Therefore the liquid fuel flow from the fuel tank 20 to the carburetor 16 through the fuel feed line is not induced by any vehicle overturn positions.

From the foregoing examinations in connection with the classified vehicle overturn positions, it has been found according to the present invention that the fuel leakage of the fuel system 14 occurs only when the vehicle body 12 is partially overturned sideways and lies on the side wall 12a toward which the carburetor 16 is deviated from the vehicle longitudinal centerline A. Therefore the fuel leakage problem inherent in the conventional motor vehicle can be solved by overcoming the fuel leakage of the fuel system 14 in this vehicle overturn position. The fuel leakage of such vehicle overturn position as in FIG. 1D can be overcome according to the present invention without incorporating any additional parts such as a valve means as will be explained hereinafter.

Figure 2:
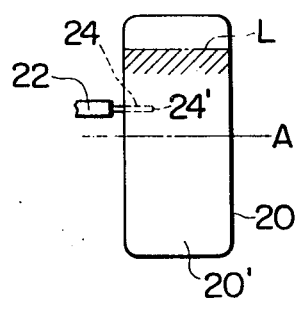
FIG. 2 is an enlarged bottom view of the fuel tank of the fuel system of FIG. 1A arranged with the end portion of the fuel return line of same according to the prior art.

FIG. 2 shows a detailed view of the conventional arrangement of the end portion of the fuel return line 22 and the bottom view of the fuel tank 20. As shown, the fuel tank 20 is provided with a line connector 24 which serves as an end portion of the fuel return line 22 to be inserted into the fuel tank 20 and through which the fuel return line 22 communicates with the interior of the fuel tank 20. Designated by reference numeral 24' is a discharge orifice of the line connector 24 only at which orifice the line connector 24 opens to the interior 20' of the fuel tank 20.

Figure 3B:
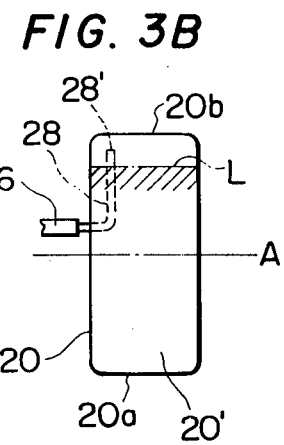
FIG. 3B is an enlarged bottom view of the fuel tank and the end portion of the fuel return line of FIG. 3A.
Figure 3A:
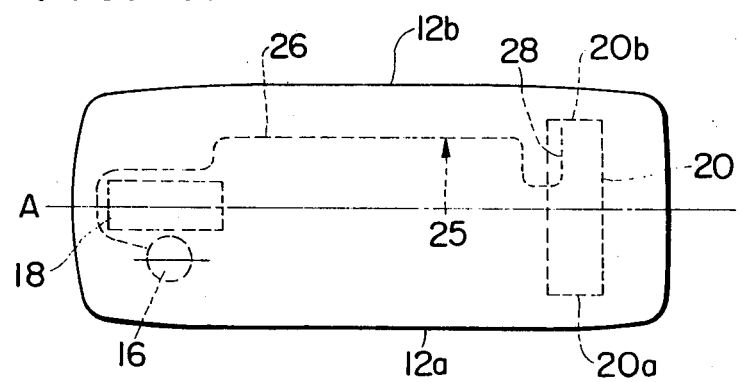
FIG. 3A is a bottom view of the motor vehicle showing a horizontal arrangement of a fuel system according to the present invention.

FIG. 3A shows a bottom view of a motor vehicle 10 provided with a fuel system 25 having an improved arrangement according to the present invention. This fuel system 25 is distinguished from the conventional fuel system 14 by its fuel return line 26 which includes an end portion 28 arranged according to the present invention.

FIG. 3B shows the detailed view of the end portion 28 of the fuel return line 26 and the bottom view of the fuel tank 20 of FIG. 3A. The end portion 28 of the fuel return line 26 is shown as a line connector as is customary. According to the present invention the line connector 28 is bent in the direction toward the second side wall 20b of the fuel tank 20 so as to communicate with the interior 20' of the fuel tank 20 in close proximity to the second side wall 20b which is directed to the second lateral wall 12b of the vehicle body 12 if the carburetor 16 is in the position deviated from vehicle longitudinal centerline A in the direction toward the first lateral wall 12a. In other words, if the carburetor 16 is arranged on the vehicle body 12 in the position which is laterally deviated from the vehicle longitudinal centerline A in the direction toward one lateral wall 12a or 12b of the vehicle body 12, the end portion 28' of the fuel return line 28 is bent in the direction toward the other lateral wall 12b or 12a so that the discharge orifice 28' of the line connector 28, only at which orifice the line connector 28 opens to the interior 20' of the fuel tank 20, is in the position in close proximity to suitable one of the side walls 12a or 12b.

With these constructions and arrangements, the prevention of fuel leakage from the fuel system is satisfactorily achieved particularly when the vehicle body is in a overturned position as shown in FIG. 1D in which the carburetor 16 is in a position vertical lower than the vehicle longitudinal centerline A because the discharge orifice 28' of the line connector 28 is now constructed and arranged to be in the position higher than the fuel level L and open to the empty space defined thereon when the vehicle body is overturned as shown in FIG. 1D.

Figure 4:
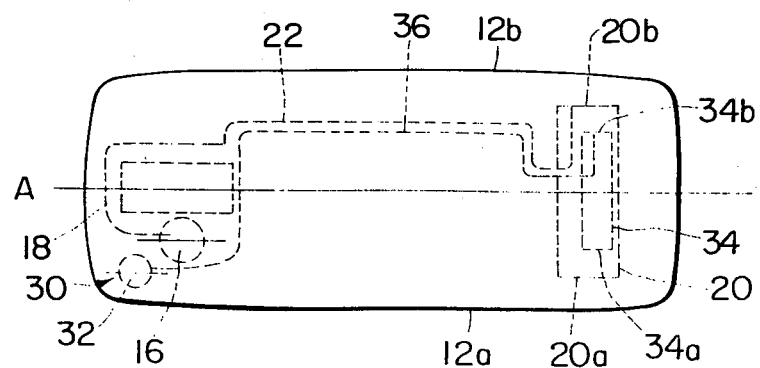
FIG. 4 is a bottom view of the motor vehicle showing a horizontal arrangement of a fuel system similar to FIG. 3A further including a fuel tank ventilation system.

Referring to FIG. 4, improvement is further made according to the present invention to the motor vehicle of FIG. 3A of which fuel system 25 is further provided with a fuel tank ventilation system 30 including a canister 32 opening to the external air through an air cleaner (not shown), a reserve tank 34 connected to the fuel tank 20 and having side walls respectively directed toward said first and second lateral walls 12a and 12b of the vehicle body 12, and a fuel tank vent line 36. As shown in the drawing, the end portion of the fuel tank vent line 36 inserted in the reserve tank 34 is bent in the direction toward the second side wall 34b thereof so as to communicate with the interior of the reserve tank 34 in close proximity to the second side wall 34b which is directed toward the second lateral wall 12b if the carburetor 16 is disposed on the vehicle body 12 in a position which is deviated from the vehicle longitudinal centerline A in the direction toward the first lateral wall 12a.

With these constructions and arrangements, the prevention of fuel leakage via a fuel tank ventilation system is satisfactorily achieved for the same reason as was explained in connection with the fuel system 25 of FIG. 3A.

From the foregoing description, it will be appreciated that the according to the present invention the solution of the fuel leakage problem inherent in the conventional motor vehicle upon accidental vehicle overturn is achieved satisfactorily by a very simple, therefore a positive and inexpensive measure without incorporating any additional parts such as a valve means.

What is claimed is:

1. In a motor vehicle having an elongated vehicle body having first and second lateral walls and a fuel system including a carburetor disposed in a position laterally deviated from a vehicle longitudinal centerline in the direction toward the first lateral wall, a fuel tank extending laterally of the vehicle body to cross the vehicle longitudinal centerline and terminating at its first and second side walls which are respectively directed toward the first and second lateral walls and a fuel return line establishing communication between the carburetor and the fuel tank, the improvement comprising said fuel return line arranged to communicate with the interior of said fuel tank in close proximity to said second side wall.

2. A motor vehicle as set forth in claim 1, in which said fuel return line comprises an end portion inserted into said fuel tank and having a discharge orifice which is located in close proximity to said second side wall.

3. A motor vehicle as set forth in claim 1, in which said fuel system further comprises a fuel tank ventilation system including a canister disposed in a position laterally deviated from a vehicle longitudinal centerline in the direction toward the first lateral wall, a reserve tank connected to said fuel tank and having side walls respectively directed toward said first and second lateral walls, and a fuel tank vent line establishing communication between the canister and the reserve tank, wherein the improvement further comprises said fuel tank vent line arranged to communicate with the interior of said reserve tank in close proximity to one of said side walls of said reserve tank which is directed toward said second lateral wall.

4. A motor vehicle as set forth in claim 3, in which said fuel tank vent line comprises an end portion inserted into said reserve tank and having a discharge orifice which is located in close proximity to said one side wall of said reserve tank.

* * * * *